US012233521B1

(12) United States Patent
Deng et al.

(10) Patent No.: US 12,233,521 B1
(45) Date of Patent: Feb. 25, 2025

(54) CLAMP PLIERS

(71) Applicants: Zhuji ITOP Hardware Tools Co., Ltd., Zhuji (CN); ZHEJIANG IWISS ELECTRIC CO., LTD., Yueqing (CN)

(72) Inventors: Xiaoming Deng, Zhuji (CN); Jiulian Xu, Zhuji (CN)

(73) Assignees: Zhejiang Iwiss Electric Co., Ltd., Yueqing (CN); Zhuji Itop Hardware Tools Co., Ltd., Zhuji (CN)

( * ) Notice: Subject to any disclaimer, the term of this patent is extended or adjusted under 35 U.S.C. 154(b) by 0 days.

(21) Appl. No.: 18/768,560

(22) Filed: Jul. 10, 2024

(51) Int. Cl.
*B25B 7/22* (2006.01)
*B25B 7/12* (2006.01)

(52) U.S. Cl.
CPC . *B25B 7/22* (2013.01); *B25B 7/12* (2013.01)

(58) Field of Classification Search
CPC .... B25B 7/02; B25B 7/06; B25B 7/12; B25B 7/22; B25B 27/02; B25B 27/10; B25B 27/14; B25B 5/04; B25B 7/08; B25B 7/14; B25B 7/18; B25B 27/146; B25F 1/00; B25F 1/003; B25F 1/006; B25F 1/04; B26B 13/02; B26B 13/06; B26B 13/22; B26B 17/00; B26B 17/006; B26D 3/001; B26D 3/169; H02G 1/005; H02G 1/1236; H01R 43/0421; H01R 43/042
See application file for complete search history.

(56) References Cited

U.S. PATENT DOCUMENTS

| | | | | | |
|---|---|---|---|---|---|
| 4,660,241 | A * | 4/1987 | Chen | B25B 7/12 29/566.4 |
| 7,155,954 | B2 * | 1/2007 | Battenfeld | B25B 27/12 81/313 |
| 11,597,064 | B2 * | 3/2023 | Glockseisen | B25B 7/123 |
| 2021/0184412 | A1 * | 6/2021 | Glockseisen | B25B 7/22 |
| 2022/0388139 | A1 * | 12/2022 | Zhou | B25B 7/08 |
| 2023/0198213 | A1 * | 6/2023 | Shen | H02G 1/005 7/107 |

FOREIGN PATENT DOCUMENTS

CN 219599181 * 8/2023

* cited by examiner

*Primary Examiner* — Robert J Scruggs
(74) *Attorney, Agent, or Firm* — Schwegman Lundberg & Woessner, P.A.

(57) ABSTRACT

A clamp plier is provided, a rotating member of the piler includes a positioning part and a cam part, a one-way retaining bearing is provided at a side of the positioning part or the cam part, the movable handle is connected with a tripping member provided with a ratchet assembly, the positioning part is connected with the ratchet assembly, and a second elastic member is connected between the tripping member and the head side plate. The fixed head includes a first cutting edge part, and the movable head includes an acting part and a second cutting edge part, and the first cutting edge part and the second cutting edge part form a jaw. The cam part and the acting part press against each other to drive a gap between the first cutting edge part and the second cutting edge part to be reduced or increased.

13 Claims, 6 Drawing Sheets

CLAMP PLIERS

TECHNICAL FIELD

The disclosure relates to the technical field of clamp crimping, in particular to a clamp plier.

BACKGROUND ART

At present, with vigorous development of infrastructure construction and requirements of environmental protection, plastic and metal pipes are used more and more frequently. In a connection process, the plastic and metal pipes are often connected in a hot melting, welding, clamping or other manner. Compared with defects of heat consumption and damaged performance of materials for the hot melting and the welding, a clamping connection is not only less leaking, safe and reliable, but also very convenient to construct.

However, existing tools for clamp crimping have following problems: 1. Existing clamp pliers need to be operated with both hands, which cannot be made in some narrow spaces and is inconvenient to use; 2. The existing clamp pliers are bulky and inconvenient to carry.

SUMMARY

In order to solve at least one of above problems, technical schemes are provided in the disclosure as follows.

A clamp plier includes a fixed handle and a movable handle. The fixed handle is connected with head side plates, a fixed head, a movable head and a rotating member are provided between the head side plates, the fixed head is connected with the movable head through a rotating shaft, a first elastic member is connected between the fixed head and the movable head, the rotating member includes a positioning part and a cam part, a one-way retaining bearing is provided at a side of the positioning part or the cam part, the movable handle is connected with a tripping member, the tripping member is provided with a ratchet assembly, the positioning part is connected with the ratchet assembly, and a second elastic member is connected between the tripping member and the head side plate. The fixed head includes a first cutting edge part, and the movable head includes an acting part and a second cutting edge part, and the first cutting edge part and the second cutting edge part form a jaw. The cam part and the acting part press against each other to drive a gap between the first cutting edge part and the second cutting edge part to be reduced or increased.

It is further provided in the disclosure that the tripping member is defined with a rotating hole, an inner wall of the rotating hole is defined with an inner groove, and the ratchet assembly includes a gear ring, a pawl and a pawl resetting member. Both the pawl resetting member and the pawl are located in the inner groove, one end of the pawl resetting member abuts against a side wall of the inner groove, and the other end of the pawl resetting member abuts against the pawl, the gear ring is connected in the rotating hole, and the pawl is matched with external teeth of the gear ring.

It is further provided in the disclosure that the gear ring is defined with a positioning hole, and the positioning part is connected in the positioning hole.

It is further provided in the disclosure that the positioning part extends outwards to form a first shaft part, the cam part extends outwards to form a second shaft part, the first shaft part and the second shaft part are respectively inserted to the head side plate, the one-way retaining bearing is arranged between the first shaft part and the head side plate, and a ball bearing is provided between the second shaft part and the head side plate.

It is further provided in the disclosure that a snap spring is respectively provided at an outer side of the one-way retaining bearing and an outer side of the ball bearing.

It is further provided in the disclosure that the fixed head is provided with a first hinge part, the movable head is provided with a second hinge part, and the rotating shaft is connected to the first hinge part and the second hinge part.

It is further provided in the disclosure that the rotating shaft includes an adjusting part and an eccentric part, one of the head side plates is defined with an opening adapted to the adjusting part, the adjusting part is located in the opening, the first hinge part and the second hinge part are each defined with a round hole, and the eccentric part is connected in the round hole.

It is further provided in the disclosure that a first hanging hole is provided at an end of the fixed head away from the first cutting edge part, and a second hanging hole is provided between the second hinge part and the acting part, and both ends of the first elastic member are respectively connected to the first hanging hole and the second hanging hole.

It is further provided in the disclosure that the tripping member is defined with a third hanging hole, one of the head side plates is defined with a fourth hanging hole, and both ends of the second elastic member are respectively connected to the third hanging hole and the fourth hanging hole.

It is further provided in the disclosure that a side of the acting part proximate to the cam part is in an arc surface, and an outer peripheral surface of the cam part includes a reset surface and a section of continuous arc surface.

Compared with related art, the technical schemes provided in the disclosure have the following beneficial effects:

An operation principle of the technical scheme is as follows. Firstly, the first elastic member is configured for driving the movable head to open a jaw of the movable head and the fixed head, and the second elastic member is configured for driving the tripping member to be reset. In crimping a clamp, the clamp is placed between the fixed head and the movable head, and the movable handle is pressed to cause the movable handle to move towards the fixed handle. At this time, a moving direction of the movable handle causes the pawl to act on the external teeth of the gear ring, and rotation of the gear ring drives the rotating member to rotate at a certain angle. The cam part on the rotating member presses on the acting part, and the movable head rotates around the rotating shaft to make the jaw between the movable head and the fixed head smaller, and the movable handle is reset under action of the second elastic element. At this time, a moving direction of the movable handle causes the pawl not to act on the external teeth of the gear ring, and the gear ring cannot be driven to rotate under action of the one-way retaining bearing. The movable handle is continuously pressed until the jaw between the movable head and the fixed head is closed, thereby crimping the clamp. When the jaw between the movable head and the fixed head is closed or nearly closed, the movable handle is pressed again and the cam part rotates again to causes the reset surface of the cam part to contact with the acting part, and the movable head returns to an initial position, that is, a jaw-open position, under action of the first resetting member.

The clamp plier according to the disclosure can be pressed by one hand to realize crimping of the clamp, thus greatly improving use flexibility. After the crimping is completed, the movable head directly returns to the jaw-open position, which facilitates direct performing of a next clamping operation. On the other hand, resetting of the movable head also reminds an operator that the crimping is completed. Meanwhile, the clamp plier is ingenious and reasonable in structural design, small in overall volume and convenient to carry.

DETAILED DESCRIPTION

Figure 1:
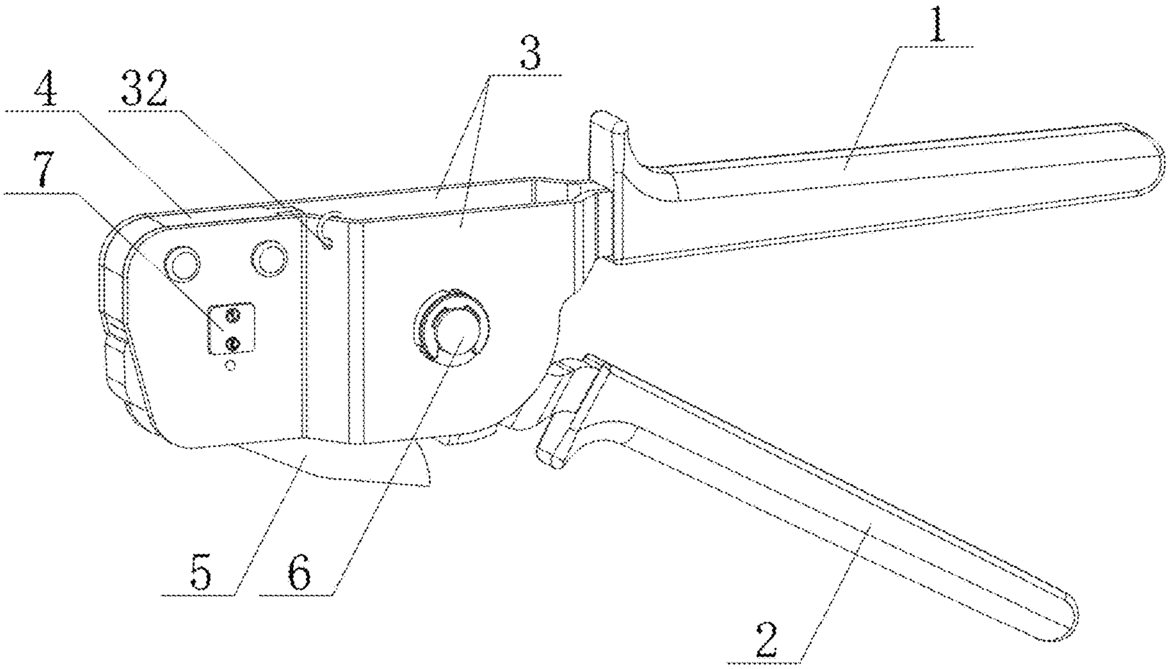
FIG. 1 is a perspective view of a clamp according to an embodiment of the present disclosure.
Figure 2:
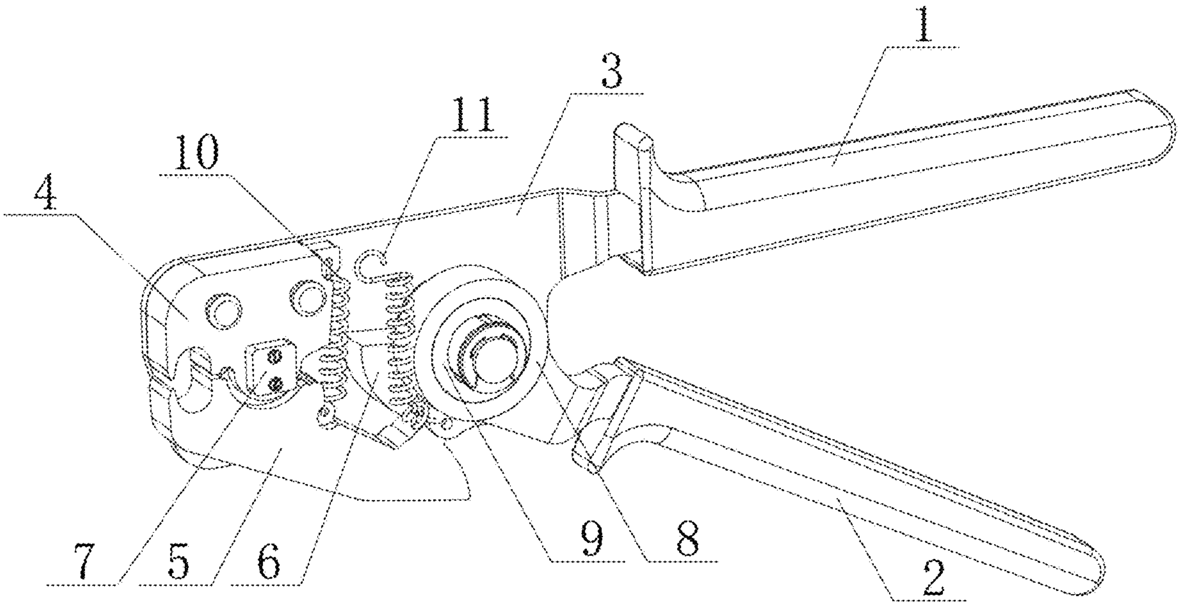
FIG. 2 is a perspective view of an embodiment of the present disclosure with a head side plate at a side removed.
Figure 3:
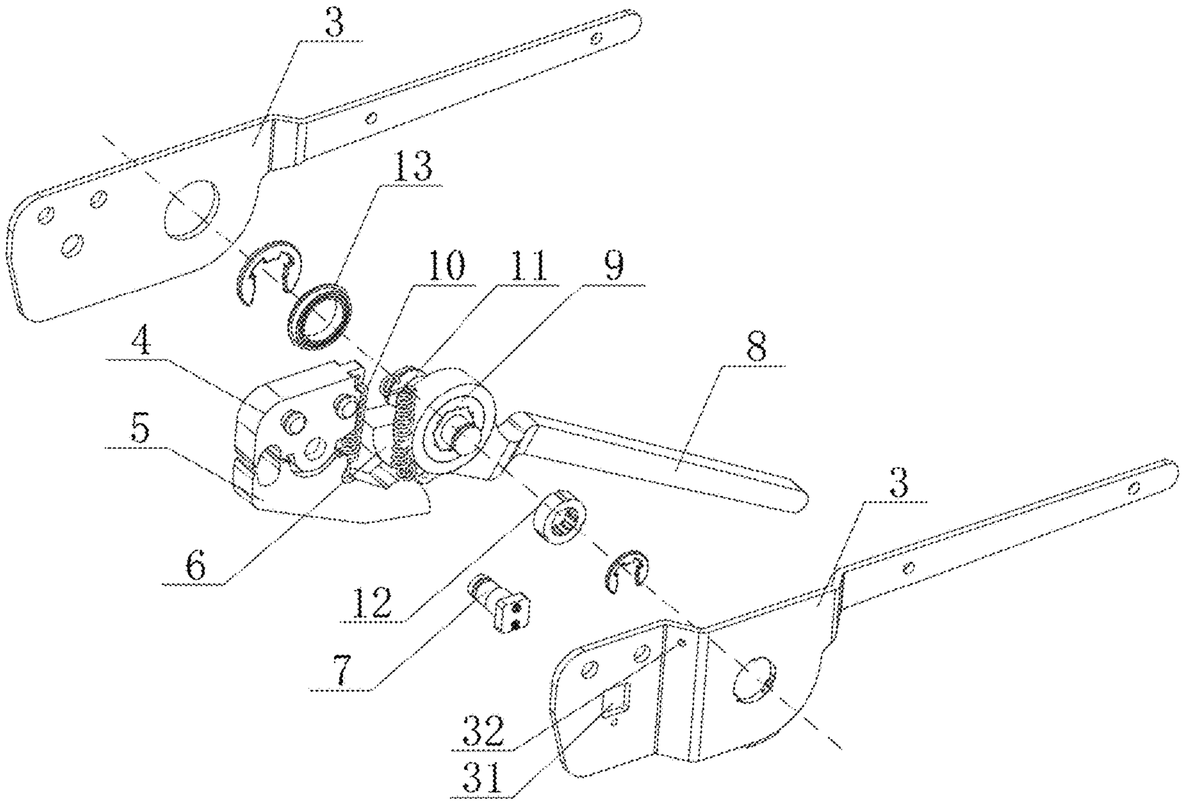
FIG. 3 is an exploded view of a clamp according to an embodiment of the present disclosure.
Figure 4:
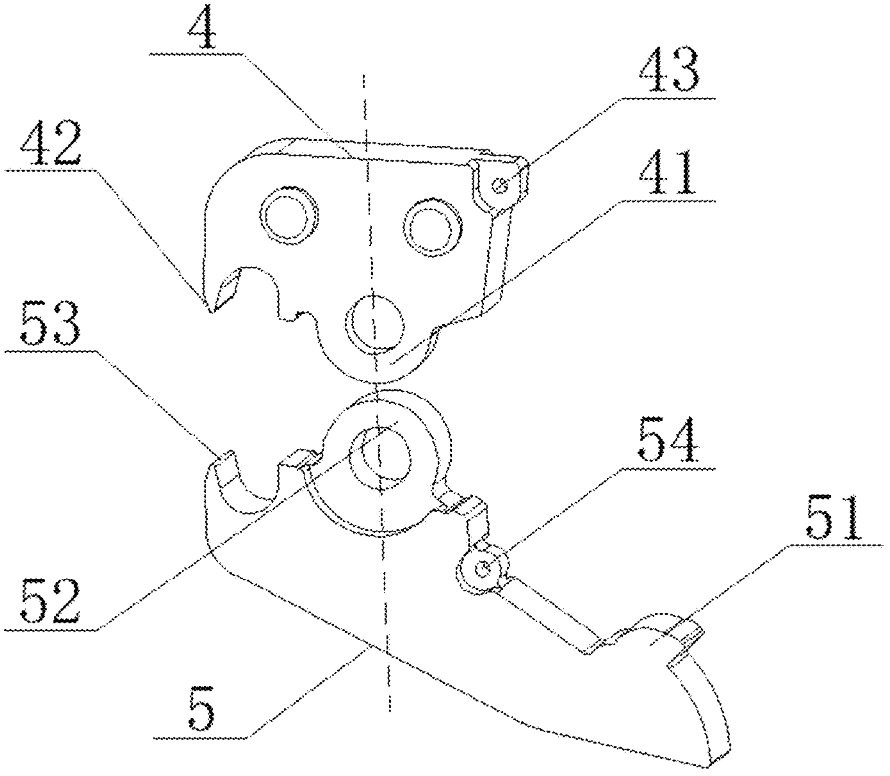
FIG. 4 is an exploded view of a fixed head and a movable head according to an embodiment of the disclosure.

In order to further understand contents of the present disclosure, the present disclosure will be described in detail with reference to drawings and examples.

It should be noted that the embodiments in the present disclosure and the characteristics in the embodiments can be combined mutually in the case of no conflict.

In description of this disclosure, it should be noted that unless otherwise specified and limited, terms “installing”, “coupling” and “connecting” should be understood broadly, for example, it can be “fixedly connecting”, “integrally connecting”, or “detachably connecting”; or it can be “mechanically connecting” or “electrically connecting”, or it can be “communicating within two elements”; or it can be “directly connecting” or “indirectly connecting through an intermediate medium”, and specific meanings of the above terms can be understood according to specific situations for ordinary shilled in the art.

With reference to FIGS. 1 to 10, a technical scheme of the disclosure is a clamp plier, which includes a fixed handle 1 and a movable handle 2. The fixed handle 1 is connected with head side plates 3, a fixed head 4, a movable head 5 and a rotating member 6 are provided between the head side plates 3, the fixed head 4 is connected with the movable head 5 through a rotating shaft 7, a first elastic member 10 is connected between the fixed head 1 and the movable head 2, the rotating member 6 includes a positioning part 61 and a cam part 62, a one-way retaining bearing 12 is provided at a side of the positioning part 61 or the cam part 62, the movable handle 2 is connected with a tripping member 8, the tripping member 8 is provided with a ratchet assembly 9, the positioning part 61 is connected with the ratchet assembly 9, and a second elastic member 11 is connected between the tripping member 8 and the head side plate 3. The fixed head 4 includes a first cutting edge part 42, and the movable head 5 includes an acting part 51 and a second cutting edge part 53, and the first cutting edge part 42 and the second cutting edge part 53 form a jaw. The cam part 62 and the acting part 51 press against each other to drive a gap between the first cutting edge part 42 and the second cutting edge part 53 to be reduced or increased.

In the above embodiment, there are two head side plates 3, and the two head side plates 3 are connected to the fixed handle 1. In another embodiment, the head side plate 3 and the fixed handle 1 may also be a same component.

In an alternative embodiment, one or both of the two head side plates 3 are recessed inward near the jaw or directly expose a cavity surrounded by the first cutting edge part 42 and the second cutting edge part 53 to facilitate operations, which is not limited in this disclosure.

In the above embodiment, both the first elastic member 10 and the second elastic member 11 are in a form of a tension spring. The first elastic element 10 is configured for driving the movable head 5 to open the jaw of the movable head 5 and the fixed head 4, and the second elastic element 11 is configured for driving the tripping member 8 to be reset.

In the above embodiment, the tripping member 8 is connected with the positioning part 61 of the rotating member 6 through the ratchet assembly 9, so that the tripping member 8 can drive the rotating member 6 to rotate only when the movable handle 2 is pressed, while the movable handle 2 cannot drive the rotating member 6 to rotate when the second elastic member 11 drives for resetting.

In this embodiment, the tripping member 8 is defined with a rotating hole 81, an inner wall of the rotating hole 81 is defined with an inner groove 82, and the ratchet assembly 9 includes a gear ring 91, a pawl 92 and a pawl resetting member 93. Both the pawl resetting member 93 and the pawl 92 are located in the inner groove 82, one end of the pawl resetting member 93 abuts against a side wall of the inner groove 82, and the other end of the pawl resetting member 93 abuts against the pawl 92, the gear ring 91 is connected in the rotating hole 81, and the pawl 92 is matched with external teeth of the gear ring 91. Optionally, the inner groove 82 is a circular groove, with a groove depth gradually decreasing from its middle to its both sides, which is not limited in the disclosure.

In this embodiment, the gear ring 91 is defined with a positioning hole 94, and the positioning part 61 is connected in the positioning hole 94.

In the above embodiment, the tripping member 8 is connected with the rotating member 6 using the ratchet assembly 9, and a structure of the ratchet assembly 9 enables to drive the rotating member 6 to rotate only when the tripping member 8 rotates toward the fixed handle 1, and a size of a rotation angle of the rotating member 6 is related to pressing of the movable handle 2.

In this embodiment, the positioning part 61 extends outwards to form a first shaft part 63, the cam part 62 extends outwards to form a second shaft part 64, the first shaft part 63 and the second shaft part 64 are respectively inserted to the head side plate 3, the one-way retaining bearing 12 is arranged between the first shaft part 63 and the head side plate 3, and a ball bearing 13 is provided between the second shaft part 64 and the head side plate 3.

In the above embodiment, the one-way retaining bearing 12 prevents the rotating member 6 from retreating, and the ball bearing 13 reduces a friction force applied when the rotating member 6 rotates. The one-way retaining bearing 12 and the ball bearing 13 are fixed to the head side plates 3 at both sides respectively.

In this embodiment, a snap spring is respectively provided at an outer side of the one-way retaining bearing 12 and an outer side of the ball bearing 13 to ensure that the rotating member 6 is stably connected to the head side plate 3.

In this embodiment, the fixed head 4 is provided with a first hinge part 41, the movable head 5 is provided with a second hinge part 52, and the rotating shaft 7 is connected to the first hinge part 41 and the second hinge part 52.

Figure 5:
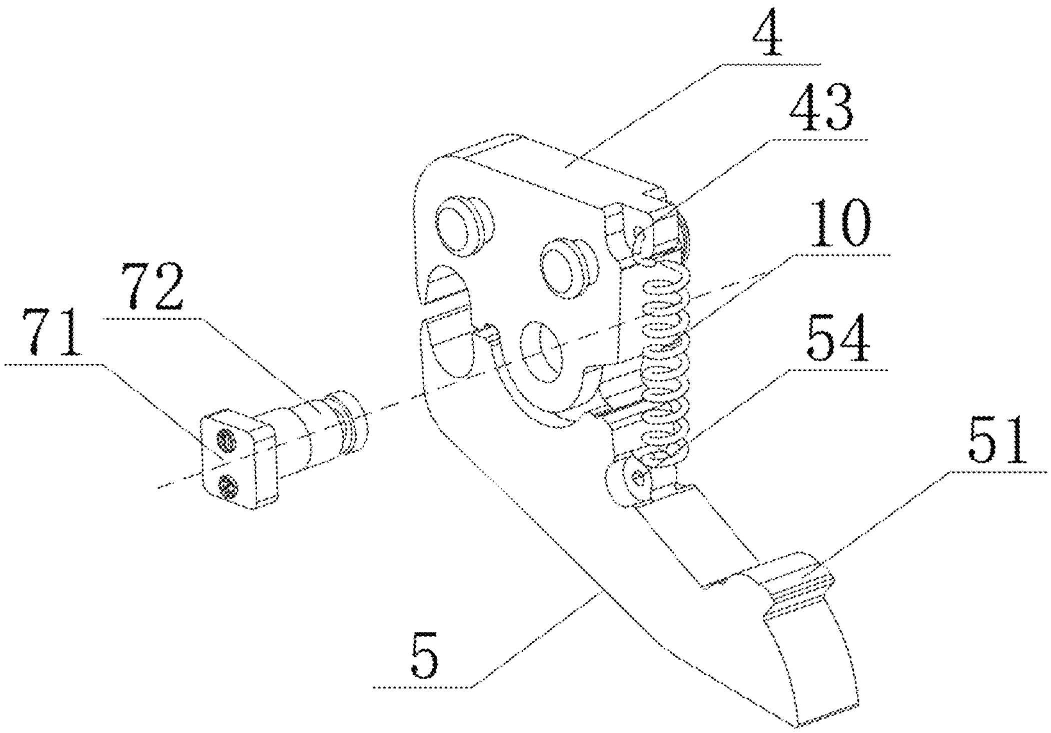
FIG. 5 is an exploded view of a head and a rotating shaft according to an embodiment of the disclosure.
Figure 6:
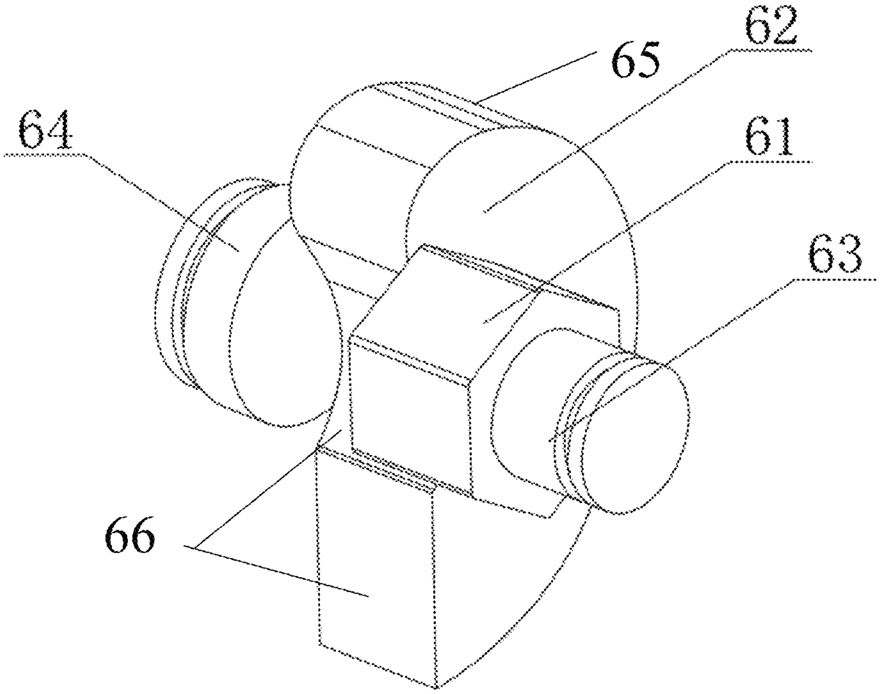
FIG. 6 is a perspective view of a rotating member according to an embodiment of the present disclosure.
Figure 7:
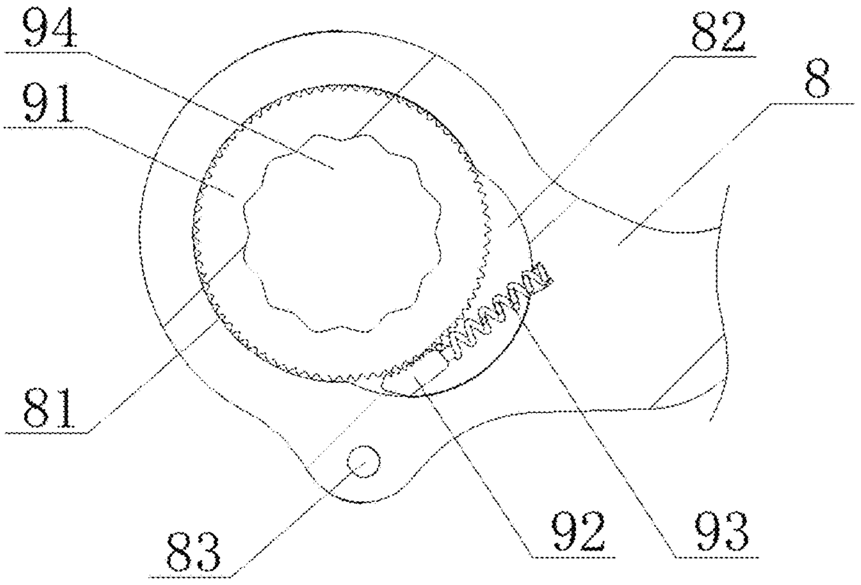
FIG. 7 is a partial sectional view of a ratchet assembly and a tripping member according to an embodiment of the present disclosure.

In this embodiment, the rotating shaft 7 includes an adjusting part 71 and an eccentric part 72, one of the head side plates 3 is defined with an opening 31 adapted to the adjusting part 71, the adjusting part 71 is located in the opening 31, the first hinge part 41 and the second hinge part 52 are each defined with a round hole, and the eccentric part 72 is connected in the round hole. As shown in FIG. 5, the adjusting part 71 is in a square shaft shape, an opening 31 on one of the head side plates 3 is adapted to the adjusting part 71. When an oversized gap occurs at the jaw between the first cutting edge part 42 and the second cutting edge part 53 after long-term use, the adjusting part is pulled out for direction adjustment (being rotated by 180 degrees) and then re-inserted, and the eccentric part 72 reduces the gap at the jaw between the first cutting edge part 42 and the second cutting edge part 53 so that the clamp plier can be used continuously, and provision of this structure can also be used for switching between a "clamp cutting function" and a "clamp crimping function". In this disclosure, a "square shaft" shape of the adjusting part is not limited in shape, and in other embodiments, it can be in any shape in which the eccentric portion 72 can be defined to be not rotate in different directions, such as a diamond shape in cross section or the like. In order to facilitate identification, adjustment marks can also be provided in the adjusting part 71 to mark different states.

In another alternative embodiment, which is not shown in the figures, a limit groove is provided at an end of the eccentric part 72 away from the adjusting part 71, and a switch piece is provided on the head side plate away from the adjusting part. One end of the switch piece is pivotally connected to the head side plate and the other end of the switch piece is matched with the limit groove to further fix the eccentric part. When an operation state needs to be switched, the switch piece rotates around the one end connected to the head side plate, the limit groove is separated from the switch piece and the adjusting part at the other end is withdrawn from the opening 31. When the rotation is completed, because the eccentric part is eccentrically arranged, a distance at the jaw is changed, thus realizing switching between two operation states. After the eccentric part rotates, the adjusting part is returned to the opening 31 and the switch piece is rotated, so that the limit groove is engaged with the switch piece and the eccentric part is fixed. Provision of the limit groove and the switch piece is not limited in the disclosure.

In this embodiment, a first hanging hole 43 is provided at an end of the fixed head 4 away from the first cutting edge part 42, and a second hanging hole 54 is provided between the second hinge part 52 and the acting part 51, and both ends of the first elastic member 10 are respectively connected to the first hanging hole 43 and the second hanging hole 54.

In this embodiment, the tripping member 8 is defined with a third hanging hole 83, one of the head side plates 3 is defined with a fourth hanging hole 32, and both ends of the second elastic member 11 are respectively connected to the third hanging hole 83 and the fourth hanging hole 32. In another embodiment, one end of the second elastic member 11 is connected with the third hanging hole 83 of the tripping member 8, and the other end of the second elastic member 11 can be connected with another hanging hole of the fixed head 4.

In this embodiment, a side of the acting part 51 proximate to the cam part 62 is in an arc surface, and an outer peripheral surface of the cam part 62 includes a reset surface 66 and a section of continuous arc surface 65. Optionally, the reset surface 66 includes a section of plane and groove which are connected with each other, which is not limited in this disclosure.

Figure 8:
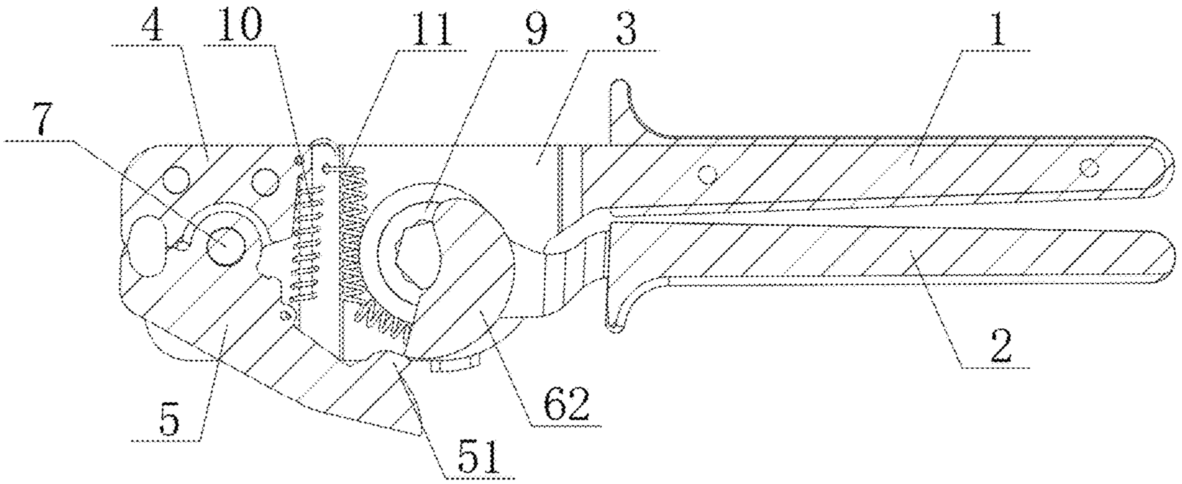
FIG. 8 is a cross-sectional view of a jaw of a clamp plier according to an embodiment of the present disclosure in a closed state.
Figure 9:
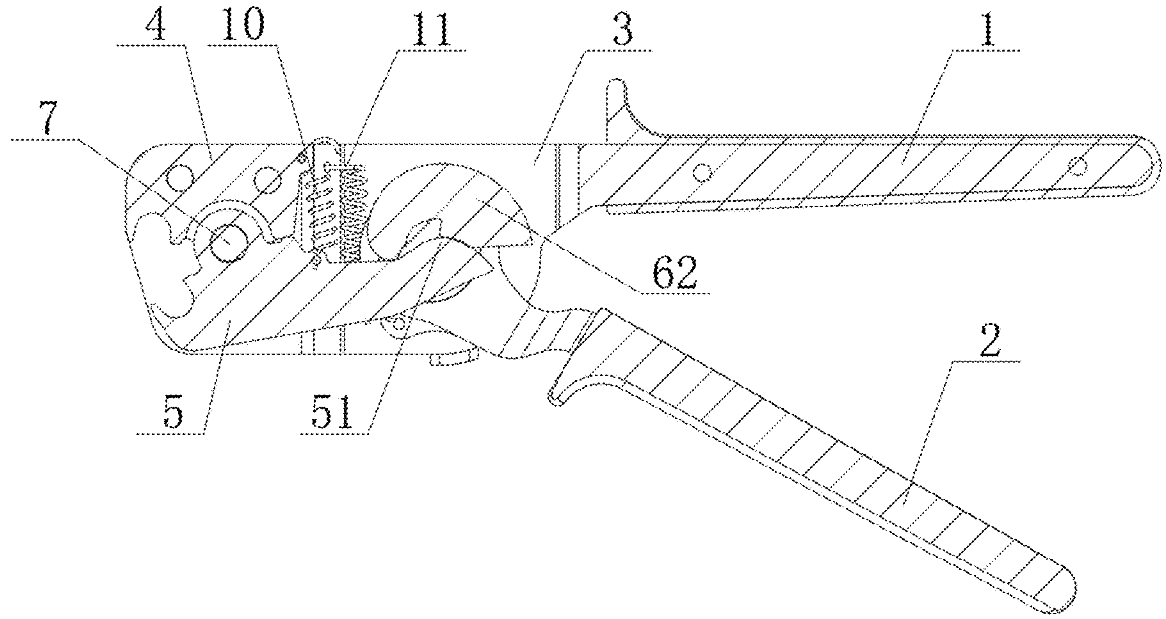
FIG. 9 is a cross-sectional view of a jaw of a clamp plier according to an embodiment of the present disclosure in an open state.
Figure 10:
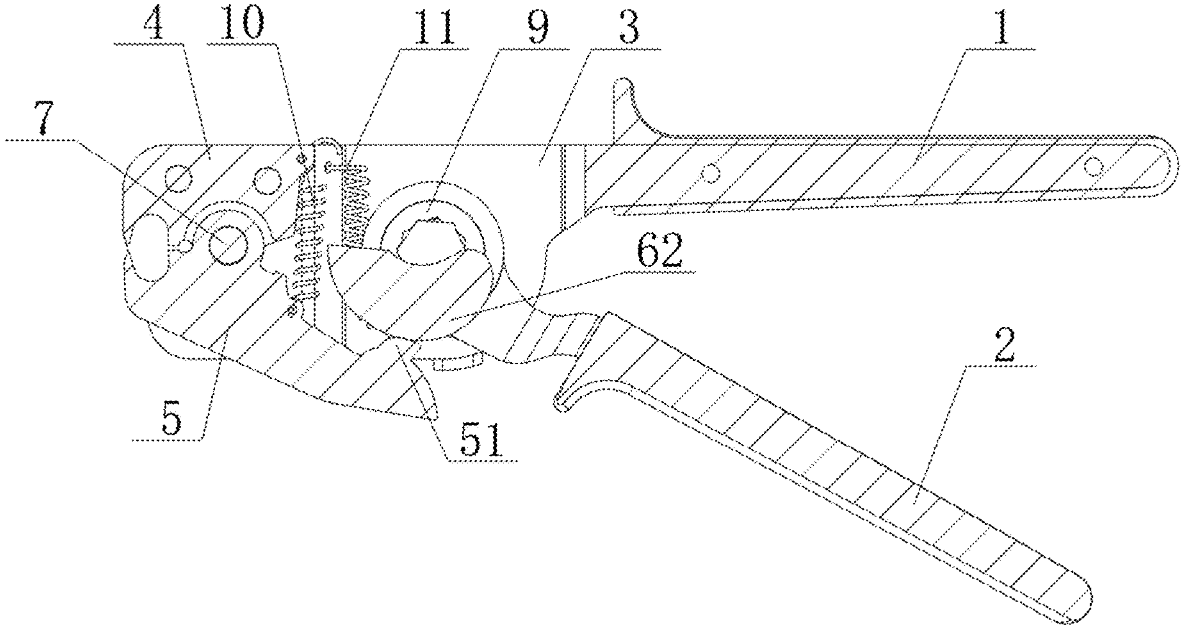
FIG. 10 is a cross-sectional view of a jaw of a clamp plier according to an embodiment of the present disclosure in a half-open state.

In the above embodiment, the arc surface of the acting part 51 and the continuous arc surface 65 of the cam part 62 enable smooth actions of the clamp plier in crimping. As shown in FIG. 8, when a highest part of an arc surface of an outermost edge of the cam part 62 is contacted with the arc surface of the acting part 51, the jaw between the movable head 5 and the fixed head 4 is in a close state. As shown in FIG. 9, when the reset surface 66 of the cam part 62 is contacted with the arc surface of the acting part 51, the jaw between the movable head 5 and the fixed head 4 is in a complete-open state. As shown in FIG. 10, the jaw between the movable head 5 and the fixed head 4 is in a half-open state.

Figure 11:
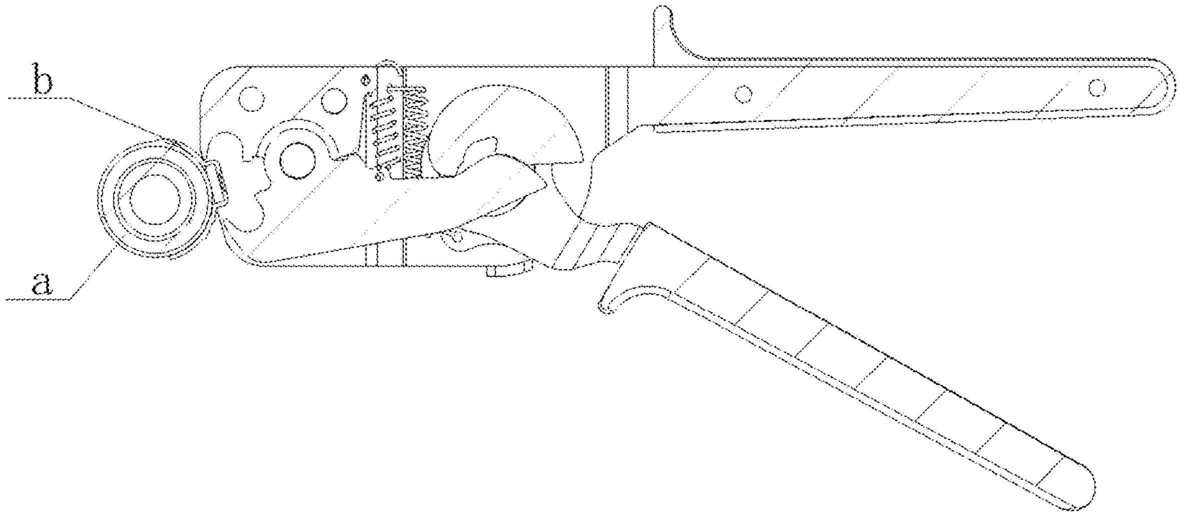
FIG. 11 is a schematic diagram before crimping a pipe clamp by a clamp plier according to an embodiment of the disclosure.
Figure 12:
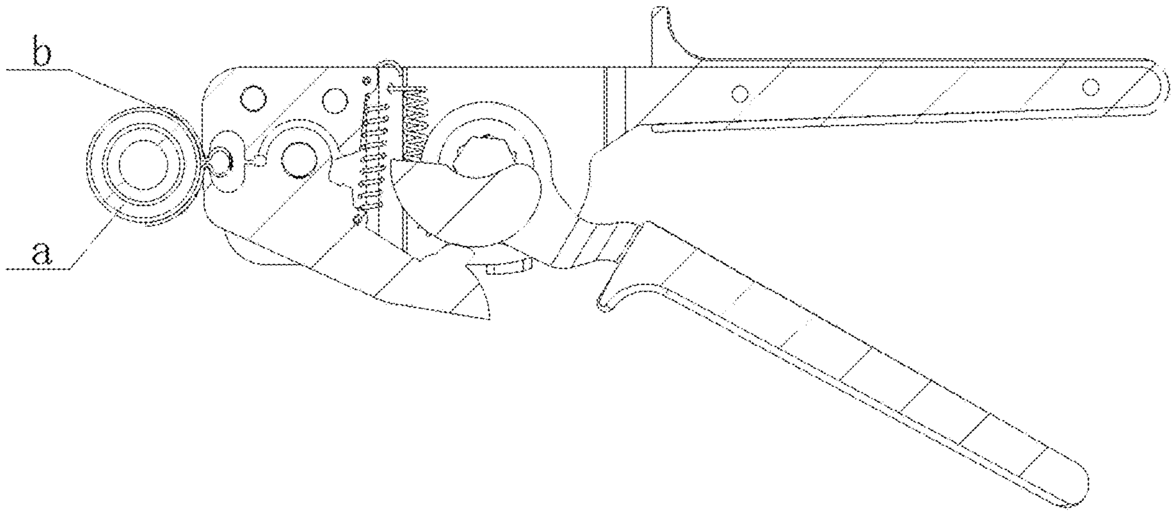
FIG. 12 is a schematic diagram after crimping a pipe clamp by a clamp plier according to an embodiment of the disclosure.

As shown in FIGS. 11 and 12, FIG. 11 is a schematic diagram before crimping a pipe clamp by the clamp plier, and FIG. 12 is a schematic diagram after crimping the pipe clamp by the clamp plier. In crimping, a clamp b on a pipe a to be crimped is placed into the jaw, and the movable handle 2 is pressed for many times continuously, so that the second cutting edge part 53 of the movable head 5 gradually approaches the first cutting edge part 42 of the fixed head 4, thereby realizing crimping of the clamp b.

The clamp plier according to the disclosure can be pressed by one hand to realize crimping of the clamp, thus greatly improving use flexibility. After the crimping is completed, the movable head directly returns to the jaw-open position, which facilitates direct performing of a next clamping operation. On the other hand, resetting of the movable head also reminds an operator that the crimping is completed. Meanwhile, the clamp plier is ingenious and reasonable in structural design, small in overall volume and convenient to carry.

The present disclosure and embodiments thereof are described above in an illustrative manner, which is not restrictive; and what is shown in the drawings is only one of the embodiments of the present disclosure, and its actual structure is not limited thereto. Therefore, structures and embodiments similar to the technical scheme designed by those of ordinary skilled in the art inspired by this disclosure without creativity, without departing from the creative purpose of the present disclosure, are all within a protection scope of the present disclosure.

What is claimed is:

1. A clamp plier, comprising a fixed handle and a movable handle, wherein the fixed handle is connected with head side plates, a fixed head, a movable head and a rotating member are provided between the head side plates, the fixed head is connected with the movable head through a rotating shaft, a first elastic member is connected between the fixed head and the movable head, the rotating member comprises a positioning part and a cam part, a one-way retaining bearing is provided at a side of the positioning part or the cam part, the movable handle is connected with a tripping member, the tripping member is provided with a ratchet assembly, the positioning part is connected with the ratchet assembly, and a second elastic member is connected between the tripping member and a head side plate; the fixed head comprises a first cutting edge part, and the movable head comprises an acting part and a second cutting edge part, and the first cutting edge part and the second cutting edge part form a jaw; and the cam part and the acting part press against each other to drive a gap between the first cutting edge part and the second cutting edge part to be reduced or increased.

2. The clamp plier according to claim 1, wherein the tripping member is defined with a rotating hole, an inner wall of the rotating hole is defined with an inner groove, and the ratchet assembly comprises a gear ring, a pawl and a pawl resetting member; both the pawl resetting member and the pawl are located in the inner groove, one end of the pawl resetting member abuts against a side wall of the inner groove, and the other end of the pawl resetting member abuts against the pawl, the gear ring is connected in the rotating hole, and the pawl is matched with external teeth of the gear ring.

3. The clamp plier according to claim 2, wherein the gear ring is defined with a positioning hole, and the positioning part is connected in the positioning hole.

4. The clamp plier according to claim 2, wherein the inner groove is a circular groove, with a groove depth gradually decreasing from its middle to its both sides.

5. The clamp plier according to claim 1, wherein the positioning part extends outwards to form a first shaft part, the cam part extends outwards to form a second shaft part, the first shaft part and the second shaft part are respectively inserted to the head side plate, the one-way retaining bearing is arranged between the first shaft part and the head side plate, and a ball bearing is provided between the second shaft part and the head side plate.

6. The clamp plier according to claim 5, wherein a snap spring is respectively provided at an outer side of the one-way retaining bearing and an outer side of the ball bearing.

7. The clamp plier according to claim 1, wherein the fixed head is provided with a first hinge part, the movable head is provided with a second hinge part, and the rotating shaft is connected to the first hinge part and the second hinge part.

8. The clamp plier according to claim 7, wherein the rotating shaft comprises an adjusting part and an eccentric part, one of the head side plates is defined with an opening adapted to the adjusting part, the adjusting part is located in the opening, the first hinge part and the second hinge part are each defined with a round hole, and the eccentric part is connected in the round hole.

9. The clamp plier according to claim 7, wherein a first hanging hole is provided at an end of the fixed head away from the first cutting edge part, and a second hanging hole is provided between the second hinge part and the acting part, and both ends of the first elastic member are respectively connected to the first hanging hole and the second hanging hole.

10. The clamp plier according to claim 1, wherein the tripping member is defined with a third hanging hole, one of the head side plates is defined with a fourth hanging hole, and both ends of the second elastic member are respectively connected to the third hanging hole and the fourth hanging hole.

11. The clamp according to claim 1, wherein a side of the acting part proximate to the cam part is in an arc surface, and an outer peripheral surface of the cam part comprises a reset surface and a section of continuous arc surface.

12. The clamp plier according to claim 1, wherein one or both of the head side plates are recessed inward near the jaw to facilitate operation.

13. The clamp plier according to claim 1, wherein a cavity surrounded by the first cutting edge part and the second cutting edge part is directly exposed to facilitate operation.

* * * * *